3,057,683
PROCESS FOR PRODUCTION OF ALUMINA FROM BAUXITE AND OTHER ALUMINOUS MATERIALS, BY PYROGENIC ATTACK, IN AGGLOMERATION PLANTS, EITHER UNDER SUCTION OR PRESSURE
Piero Lecis and Antonio Guidi, Milan, Italy, assignors to Montecatini Societa Generale per l'Industria Mineraria e Chimica, Milan, Italy, a corporation of Italy
No Drawing. Filed Mar. 28, 1958, Ser. No. 724,506
Claims priority, application Italy Mar. 29, 1957
16 Claims. (Cl. 23—141)

The present invention relates to processes for treating aluminum materials to transform the alumina therein contained into a water-soluble form.

A number of processes are known for extracting alumina from aluminous materials. However, some of the well known processes, such as treatment with alkaline liquids by the Bayer process, are not suitable for working all types of aluminum minerals. In the case of certain minerals, such as bauxites having a high $SiO_2$ content, or minerals having a diaspore structure, or a low $Al_2O_3$ content, it is preferable to dissolve the alumina by pyrogenic attack, involving either complete melting, and recovery of $Al_2O_3$ from slags, or sintering.

The complete melting type of attack generally requires very high amounts of fuel and reactants; therefore melting has been avoided by adopting the sintering type of attack, to save fuel and reactants.

Three main types of process are known for the attack of aluminum materials by sintering, namely:

(a) Using fuel and sodium carbonate
(b) Using fuel and lime or limestone
(c) Using fuel, sodium carbonate and lime.

By process a satisfactory yields could not be obtained until now, in the extraction of soluble alumina from the treated minerals, in spite of the high consumption of reactants.

In fact, according to a process known for more than 30 years, see German Patent No. 550,618, with a consumption of 34 kg. coal and 66 kg. sodium carbonate per 100 kg. of treated bauxite, solubilized alumina yields not higher than 50–60% of the total alumina content of the mineral were obtained.

Process b (attack with lime or limestone alone) has no significant bearing on the present invention.

The process c made possible high yields of extracted alumina (about 90%) in soluble form; see German Patent No. 906,570. But this process is not free of disadvantages in respect to the consumption of fuel and reactants, and also because of its inherent technical difficulty, since it is substantially based upon the recycling of high amounts, from 60 to 80%, of the already sintered material. In process c the mass of material to be sintered should be given a physical structure as homogeneous as possible so that the combustion can reach the whole mass of the granule uniformly, thus reacting the alumina with alkali at each point of the same granule, and causing its transformation into soluble aluminate. This aim is attained in the known process mainly by recycling amounts, corresponding to 60%, and even more, of the already burnt porous material, in the form of a fraction having a size lower than 8 mm., this amount forming the skeleton needed to allow regular passage of air through the mass during the combustion. Moreover, a second auxiliary physical action, also serving to form a skeleton for the granules to be sintered, is exerted by a portion of lime which, due to its high melting point, does not melt at the sintering temperature. However, a process of this kind involves an obvious increase in installation and working costs and, at the same time, a marked decrease in the hourly productive capacity of the plant. As a matter of fact, it is sufficient to consider that, on the basis of a minimum recycle amount of 60% by weight of the fresh mixture, the actual production of a sintering belt or of a sintering pan plant including the recycling appears to correspond to 65% of the actual potentiality of the same plant without recycling.

By said method of attack employing recycling, the consumption of reactants and fuel was in practice kept within the limits of 20 kg. coal, 66 kg. sodium carbonate and 20 kg. lime per 100 kg. of treated bauxite, with solubilization yields of about 90% of the alumina content of the mineral.

It has now been found, and this is the principal object of the present invention, that the same results, that is the solubilization of about 90% of the alumina content by pyrogenic attack of bauxite with the lime and soda process, can be obtained according to an improved process based on different criteria, while, at the same time, a higher unitary production is obtained with a lower consumption of reactants and fuel. One of the advantages of the present invention lies in the fact that all recycling of the already burnt material is deliberately avoided, resulting in a very definite technologic simplification of the plant and its operation.

The aim of assuring that the granules to be sintered have the required skeleton, which renders possible uniform combustion, is attained according to criteria explained hereinbelow, which are completely different, and do not involve the use either of the recycling material, or of lime, for that purpose, in contradistinction to the process of the above-mentioned German Patent No. 906,570. A saving of about 10% of fuel is obtained in comparison with the afore-mentioned process. A further advantage obtained with the present process is that, with the same high solubilization yields of the alumina contained in the treated minerals, a lower consumption of alkaline reactants (lime) is obtained.

According to the present invention the aim of preparing granules through which the combustion air can uniformly penetrate is attained without employing the recycling of material and the use of lime for preparing a kind of skeleton for the granules. Special methods for preparing the granulated material to be sintered are employed instead.

In respect to lime, some authors attributed a triple function to it in the mixture. They indicate that there is a first exclusively chemical function of supplying, by quick reaction with sodium carbonate, a molten caustic alkali at the time of sintering, which in its turn, reacts quickly with the alumina of the mineral, thus forming sodium aluminate. There is a second function, again of a chemical nature, due to the fact that lime, through the formation of calcium silico-aluminate, reduces the loss of soda which, otherwise, would be blocked as insoluble sodium silico-aluminate; and finally there is a third function, of a merely physical character, that of serving as a skeleton.

In the improved process of the present invention a considerable saving of alkaline reactants, and of lime in particular, is realized, since the latter is added to the mixture in the amount strictly needed for lowering the above-mentioned losses of soda, thus excluding that any function of a physical character, apt to improve the porosity of the mixture, can be attributed to the lime.

In our process, the use of lime, as hydrate, is reduced from the 20% used in the known processes, to about 12%–10%, calculated on the amount of treated bauxite, thus assuring a 50% saving of this reactant. The extraction yield of $Al_2O_3$ is substantially the same. In respect to coal consumption, satisfactory yields of solubilized alumina have been obtained with a total consumption of 18 kg. coal per 100 kg. of treated bauxite. This is a 10% saving in comparison with the known process.

It has been found that a suitable permeability for the sintering can be obtained by employing a mixture having a given granule size and in which the single granules, in particular those which lie in the lower strata of the sintering pan, have the property of remaining compact. That is, the water released during the advancing of the combustion front downwards, in the case that the combustion takes place by suction of the gases from the bottom, does not break the granules provided in accordance with the present invention. The purpose is to obtain a mixture which, in addition to the afore-mentioned chemical composition, mineral+fuel+reactants, presents also a physical structure capable of responding to these requirements.

The process for pyrogenic attack of bauxites by sintering a mixture of a ground mineral, previously mixed with the fuel and the required reactants, consists mainly of the following operations:

(1) Grinding of the various components of the mixture
(2) Mixing and wetting of the mixture
(3) Granulation
(4) Sintering by combustion (under suction or pressure)
(5) Leaching of the sintered mass A preferred mode of carrying out the invention is as follows:

The powdered mixture of bauxite-sodium carbonate-dry lime, intimately mixed, is placed in suitable amounts in a mixing drum, or in any suitable machine, such as a screw mixer, previously heated to about 40° C. In this drum or mixer the mixture is wetted with a measured amount of water, and is heated to 50–55° C., and nodulized. By suitably regulating the apparatus, granules with a diameter of 1 to 3 mm. are obtained to which the needed coal amount, also as a powder or granules with a size not greater than 2 mm., is added.

On leaving the granulator the mixture can be dried on a net belt through which the fumes or gas recovered from the last chamber of the sintering plant are passed, as drying agent.

By this process the formation of the higher hydrates of sodium carbonate (hepta- and decahydrate) is avoided, thus obtaining also the stabilization of the granules, which contain sodium carbonate in the monohydrate state.

The main characteristic of the above improvement comprises the two above-mentioned factors, that is, the addition of water in the amounts and conditions needed for the hydration of sodium carbonate to the monohydrate form (or else the use of starting material already containing the needed amount of water in the form of hydration water and/or moisture), and the granulation of the mixture into granules of 1 to 3 mm. In this way the granules acquire a compactness which makes it possible to avoid the need to use substances, such as recycling material and/or lime, in order to form a skeleton for the granules. Of course the amount of water to be added if any, also depends on the physical characteristics of the soda-containing material employed in the process, as well as on the method and apparatus used for granulation. An excess of moisture over the degree compatible with satisfactory conduction of the sintering operation (this latter being normally about 15% calculated on the total mixture) may be required for granulation. Then drying becomes necessary to remove said excess.

On leaving the drying belt the mixture passes into the sintering apparatus, a belt or pan, in which the baking process has a duration of about 8–10 minutes for a 30 cm. thick layer.

The suction under the grid, in the case of a plant under suction, is kept for instance at a pressure differential of 400–500 mm. of water.

According to an alternative to the process of the present invention, small spheres or pellets having greater size, for instance of a diameter up to about 10 mm., can be obtained from the granulator instead of the lower size granules. In this case it is opportune to previously dry the small pellets as in the preceding case. The pellets should then be broken, for example in a roll grinder. Coal is then added and the whole is charged into the sintering pan including also the small proportion of powder obtained.

According to another alternative, cakes containing sodium carbonate monohydrate, sodium hydroxide and alumina, resulting from the purification of the liquors of a normal Bayer plant, can be substituted for the whole or a portion of sodium carbonate (Solvay soda).

In this case, as said, the wetting of the starting materials is not necessary because the starting materials in this case are already sufficiently hydrated, that is, they contain sodium carbonate in already sufficiently hydrated form. They are mixed directly with coal, in a continuous or batch mixer, and the mixture obtained is then charged into the sintering pan. The operational cycle is thus further simplified.

The following examples illustrate preferred but not exclusive embodiments of the process.

These examples were carried out using a bauxite with a granulometry of 0/1 and the following average composition (percent by weight):

$SiO_2$, 4.60%; Fe, 24.10%; $TiO_2$, 3.30%; CaO, 1.50%; $Al_2O_3$, 53.30%; balance (13.2%) components not determined.

Example 1

A mixture consisting of 55% (by weight) bauxite, 5.5% calcium hydroxide, and 39.5% sodium carbonate was dry mixed and then treated in a granulating drum at 40° C. with water atomized at 65° C. The water was 20% by weight of the mixture. Powdered coke was added in amount of 10% by weight of the dry bauxite-lime-soda mixture. The moisture content of the coke was about 12%. The granules thus formed were dried for 8 minutes with hot waste gas at 150°–175° C. (temperature of the granules under drying, about 100° C.) and then treated in a sintering pan. The baking operation had a duration of 10 minutes. The maximum temperature of the outlet gases was 280° C. The sinter obtained was ground and leached with water at 90° C. Analysis showed that 89.6% of the total alumina was dissolved in the solution.

Example 2

A mineral-lime-soda mixture having the same composition as that mentioned in Example 1 was wetted in a similar way and pelletized into granules having an average size of 8–10 mm.

The pellets were dried for 10 minutes as in Example 1 and then broken in a roll grinder to 1–3 mm. largest dimension, mixed with coal in the same amount as in the preceding example and charged into the sintering pan. The baking duration in this case was 12 minutes and the outlet gases had a maximum temperature of 295° C. The sinter obtained was successively treated as in the preceding example, and a yield of solubilized alumina of 88.9% was obtained.

Example 3

A bauxite with the same mineral composition as that of the preceding examples was treated with purified salts, coming from the liquids of a Bayer plant and having the following composition:

$Na_2O$, 7.40%; $Na_2CO_3$, 60.50%; $Al_2O_3$, 3.80%; total $H_2O$ (hydration water + residual moisture) 26.50%; balance components (1.80%) not determined. (Percent are by weight.)

Lime and powdered coke in the following proportion (by weight) were also mixed therewith:

Bauxite 42%, hydrated lime 5%; salt cakes (composition given above) 43%; powdered coke 10%.

The final mixture was obtained by mixing the various components in a screw mixer, from which a granulated material was obtained (1 to 3 mm. in largest size) that could be charged directly into the sintering pan.

The baking duration was 21 minutes and the maximum temperature of the outlet combustion gases was 260° C.

After leaching the sinter obtained as above described it was ascertained that the solubilized alumina was 91.45% of the total content.

The sintering apparatus is operable under suction or pressure. The aluminum mineral may contain aluminum in the form of hydroxides and, or, silicates. The soda (sodium carbonate) and lime may be partially hydrated or dehydrated or burnt, respectively. The lime is employed only in an amount required to function as reactant, with the silica in a range of molar ratios $CaO:SiO_2$ of from about 1.6:1 to about 2:1. The sodium carbonate remains blocked in the granules in monohydrate form. The sodium carbonate is partially or entirely substituted by salts derived from the purification of the caustic liquors of a Bayer plant.

We claim:

1. A process of extracting the aluminum content of siliceous bauxite substantially without recycling of sintered material from the process, comprising agglomerating into granules a mixture of bauxite, sodium carbonate, and a compound of the group consisting of lime and calcium hydroxide, with total water present in the agglomeration, including that combined in the calcium hydroxide, substantially in an amount necessary for but not substantially greater than that required for the hydration of the sodium carbonate to the monohydrate form, formation of the higher hydrates being avoided, the agglomerating being at a temperature of about 40 to 65° C., the granules being about 1 to 3 mm. in their largest dimension, the calcium oxide content of the granules being that required to bind at least the major part, by weight, of the silica content of the bauxite as calcium silico-aluminate to reduce loss of the sodium carbonate as insoluble sodium silico-aluminate and being not substantially more than that stoichiometrically required to bind all of the said silica content, being in a molar ratio of CaO to $SiO_2$ of from about 1.6 to one to about two to one, adding granular carbonaceous fuel and sintering, the sintering being carried out by heat derived by combustion of said fuel, and then leaching with water.

2. A process of extracting the aluminum content of a siliceous aluminum oxide mineral substantially without recycling of sintered material from the process, comprising agglomerating a mixture of said mineral, sodium carbonate, and a compound of the group consisting of lime and calcium hydroxide, with total water present in the agglomeration, including that combined in the calcium hydroxide, substantially in an amount necessary for but not substantially greater than that required for the hydration of the sodium carbonate to the monohydrate form, formation of the higher hydrates being avoided, the agglomerating being at a temperature of about 40 to 65° C., the resulting granules being about 1 to 3 mm. in their largest dimension, the calcium oxide content of the granules being that required to bind at least the major part, by weight, of the silica content of the mineral as calcium silico-aluminate to reduce loss of the sodium carbonate as insoluble sodium silico-aluminate and being not substantially more than that required to bind all of the said silica content, being in a molar ratio of CaO to $SiO_2$ of from about 1.6 to one to about two to one, adding granular carbonaceous fuel and sintering, the sintering being carried out by introducing air to burn said fuel, and then leaching with water.

3. A process of extracting the aluminum content of siliceous bauxite substantially without recycling of sintered material from the process, comprising agglomerating a mixture of bauxite, sodium carbonate, and a compound of the group consisting of lime and calcium hydroxide, with total water present in the agglomeration, including that combined in the calcium hydroxide, in an amount needed for but not substantially greater than that required for the hydration of the sodium carbonate to the monohydrate form, formation of the higher hydrates being avoided, the agglomerating being at a temperature of about 40 to 65° C., the resulting granules being about 1 to 3 mm. in their largest dimension, the calcium oxide content of the granules being added to form calcium silico-aluminate to reduce loss of sodium carbonate as insoluble sodium silico-aluminate and being not more than about 10% by weight of the bauxite, adding granular carbonaceous fuel and sintering, the sintering being carried out by introducing air to burn said fuel, and then leaching with water.

4. A process of extracting the aluminum content of bauxite substantially without recycling of sintered material from the process, comprising forming granules of bauxite, sodium carbonate, and a compound of the group consisting of lime and calcium hydroxide, with total water present in the granulation, including that combined in the calcium hydroxide, in an amount necessary for but not substantially greater than that required for the hydration of the sodium carbonate to the monohydrate form, formation of the higher hydrate being avoided, the total water being about 20% by weight of the mixture, the granulating being carried out at a temperature of about 40° to 65° C., the granules being about 1 to 3 mm. in their largest dimension, the calcium oxide content being about 10% by weight of the bauxite, adding granular carbonaceous fuel and drying to a maximum of about 15% moisture calculated on the basis of the total mixture and sintering, the sintering being carried out by heat derived by combustion of said fuel, and then leaching with water.

5. A process of extracting the aluminum content of siliceous bauxite substantially without recycling of sintered material from the process, comprising forming granules of a calcium compound of the group consisting of lime and calcium hydroxide, bauxite, purified salts derived from the liquids of a Bayer process for extracting alumina, said purified salts being comprised of $Na_2O$, $Na_2CO_3$, and $Al_2O_3$, and powdered coke and water, the granules being about 1 to 3 mm. in largest dimension, the water present, combined and free, being not more than that required for the hydration of the sodium carbonate to the monohydrate form, the granulating being carried out at a temperature of about 40° to 65° C., said calcium compound being present in an amount substantially no more than that required to bind the silica as calcium silico-aluminate, being in a molar ratio of CaO to $SiO_2$ of from about 1.6 to one to about two to one, to reduce loss of the sodium carbon as insoluble sodium silico-aluminate, sintering the granules, the sintering being carried out by heat derived by combustion of said fuel, and leaching with water.

6. A process of extracting the aluminum content of a siliceous aluminum ore substantially without recycling of sintered material from the process, comprising forming granules of the ore, a calcium compound of the group consisting of lime and calcium hydroxide, purified compounds derived from the liquids of a Bayer process for extracting alumina, said purified compounds being comprised of $Na_2O$, $Na_2CO_3$, and $Al_2O_3$, and powdered coke and water, the granules being about 1 to 3 mm. in largest dimension, the water present, combined and free, being not more than that required for the hydration of the sodium carbonate to the monohydrate form, the total water being about 20% by weight of the mixture, the granulating being carried out at a temperature of about 40° to 65° C., said calcium compound being present in an amount substantially no more than that stoichiometrically required to bind the silica as calcium silico-aluminate, to reduce loss of the sodium carbonate as insoluble sodium silico-aluminate, sintering the granules, the sintering being carried out by introducing air to burn said coke, and leaching with water.

7. A process of extracting the aluminum content of siliceous bauxite substantially without recycling of sintered material from the process, comprising agglomerating a mixture of bauxite, sodium carbonate, and a calcium compound of the group consisting of lime and calcium hydroxide, with total water present in the granulation, including that combined in the calcium hydroxide, substantially in an amount necessary for but not substantially greater than that required for the hydration of the sodium carbonate to the monohydrate form, formation of the higher hydrates being avoided, the agglomerating being carried out at a temperature of about 40° to 65° C., the resulting granules being dried and ground to a size of about 1 to 3 mm. in their largest dimension, the calcium oxide content of the granules being that stoichiometrically required to bind at least the major part of the silica content of the mineral as calcium silico-aluminate to reduce loss of the sodium carbonate as insoluble sodium silico-aluminate and being not substantially more than that stoichiometrically required to bind all of the said silica content, adding granular carbonaceous fuel and thereafter sintering, the sintering being carried out by heat derived by combustion of said fuel, and then leaching with water.

8. A process of extracting the aluminum content of siliceous bauxite substantially without recycling of sintered material from the process, comprising granulating a mixture of bauxite, sodium carbonate, and a calcium compound of the group consisting of lime and calcium hydroxide, with total water present in the granulation, including that combined in the calcium hydroxide, substantially in an amount necessary for but not substantially greater than that required for the hydration of the sodium carbonate to the monohydrate form, formation of the higher hydrates being avoided, the total water being about 20% by weight of the mixture, the granulating being carried out at a temperature of from about 40° C. to 65° C., the resulting granules being dried and ground to a size of about 1 to 3 mm. in their largest dimension, the calcium oxide content of the granules being that stoichiometrically required to bind at least the major part of the silica content of the mineral as calcium silico-aluminate to reduce loss of the sodium carbonate as insoluble sodium silico-aluminate and being not substantially more than that stoichiometrically required to bind all of the said silica content, adding granular carbonaceous fuel and sintering, and then leaching with water, the said calcium compound, calculated as calcium hydroxide, being present in the range of from 10 to 12% by weight of the bauxite, said sintering being carried out by introducing air to burn said fuel, the hot combustion gases being withdrawn from the bottom thereof by suction, said drying after adding the fuel being to the extent required to result in a maximum of about 15% moisture calculated on the basis of the total mixture.

9. A process of extracting the aluminum content of siliceous bauxite substantially without recycling of sintered material from the process, comprising granulating a mixture of bauxite, sodium carbonate, and a calcium compound of the group consisting of lime and calcium hydroxide, with total water present in the granulation, including that combined in the calcium hydroxide, substantially in an amount necessary for but not substantially greater than that required for the hydration of the sodium carbonate to the monohydrate form, the total water being about 20% by weight of the mixture, the granulating being carried out at a temperature of from about 40° C. to 65° C., formation of the higher hydrates being avoided, the resulting granules being dried and ground to a size of about 1 to 3 mm. in their largest dimension, the calcium oxide content of the granules being that stoichiometrically required to bind at least the major part of the silica content of the mineral as calcium silico-aluminate to reduce loss of the sodium carbonate as insoluble sodium silico-aluminate and being not substantially more than that stoichiometrically required to bind all of the said silica content, adding granular carbonaceous fuel and thereafter sintering, and then leaching with water, said sintering being carried out by introducing air to burn said fuel, the hot combuston gases being withdrawn from the bottom thereof by suction.

10. A process of extracting the aluminum content of siliceous bauxite substantially without recycling of sintered material from the process, comprising agglomerating into granules a mixture of bauxte, sodium carbonate, and a compound of the group consisting of lime and calcium hydroxide, with total water present in the agglomeration, including that combined in the calcium hydroxide, substantially in the amount necessary for but not substantially greater than that required for the hydration of the sodium carbonate to the monohydrate form, formation of the higher hydrates being avoided, the granules being about 1 to 3 mm. in their largest dimension, the agglomerating being carried out at a temperature of from about 40° C. to 65° C., the calcium oxide content of the granules being that required to bind at least the major part, by weight, of the silica content of the bauxite as calcium silico-aluminate to reduce loss of the sodium carbonate as insoluble sodium silico-aluminate and being not substantially more than that stoichiometrically required to bind all of the said silica content, being in a molar ratio of CaO to $SiO_2$ of from about 1.6 to one to about two to one, adding granular carbonaceous fuel and sintering, and then leaching with water, said sintering being carried out by introducing air to burn said fuel, the hot combustion gases being withdrawn from the bottom thereof by suction.

11. A process of extracting the aluminum content of a siliceous aluminum ore substantially without recycling of sintered material from the process, comprising forming granules of the ore, a calcium compound of the group consisting of lime and calcium hydroxide, purified compounds derived from the liquids of a Bayer process for extracting alumina, said purified compounds being comprised of $Na_2O$, $Na_2CO_3$, and $Al_2O_3$, and powdered coke and water, the granules being about 1 to 3 mm. in largest dimension, the water present, combined and free, being not more than that required for the hydration of the sodium carbonate to the monohydrate form, the granulating being carried out at a temperature of about 40° C. to 65° C., said calcium compound being present in an amount substantially not more than that stoichiometrically required to bind the silica as calcium silico-aluminate, to reduce loss of the sodium carbonate as insoluble sodium silico-aluminate, drying where necessary to result in a maximum of about 15% moisture calculated on the basis of the total mixture, sintering the granules, and leaching with water, the said calcium compound, calculated as calcium hydroxide, being present in the range of from 10 to 12% by weight of the ore, said sintering being carried out by introducing air to burn said fuel, the hot combustion gases being withdrawn from the bottom thereof by suction.

12. A process of extracting the aluminum content of siliceous bauxite substantially without recycling of sintered material from the process, comprising agglomerating a mixture of bauxite, sodium carbonate, and a compound of the group consisting of lime and calcium hydroxide, with total water present in the agglomeration, including that combined in the calcium hydroxide, in an amount needed for but not substantially greater than that required for the hydration of the sodium carbonate to the monohydrate form, formation of the higher hydrates being avoided, the agglomerating being carried out at a temperature of from about 40° C. to about 65° C., the resulting granules being about 1 to 3 mm. in their largest dimension, the calcium oxide content of the granules being added to form calcium silico-aluminate to reduce loss of sodium carbonate as insoluble sodium silico-aluminate and being not more than about 10% by weight of the bauxite, adding granular carbonaceous fuel and sintering, and then leaching with water, said sintering being carried out by introducing air to burn said fuel, the hot combustion gases being withdrawn from below by suction.

13. A process of extracting the aluminum content of siliceous bauxite substantially without recycling of sintered material from the process, comprising agglomerating a mixture of bauxite, sodium carbonate, and a compound of the group consisting of lime and calcium hydroxide, with total water present in the agglomeration, including that combined in the calcium hydroxide, in an amount needed for but not substantially greater than that required for the hydration of the sodium carbonate to the monohydrate form, formation of the higher hydrates being avoided, the agglomerating being carried out at a temperature of from about 40° C. to about 65° C., the resulting granules being about 1 to 3 mm. in their largest dimension, the calcium oxide content of the granules being added to form calcium silico-aluminate to reduce loss of sodium carbonate as insoluble sodium silico-aluminate and being not more than about 10% by weight of the bauxite, adding granular carbonaceous fuel and sintering, and then leaching with water, said intering being carried out by introducing air to burn said fuel, the hot combustion gases being withdrawn from below by suction, the maximum temperature of the outlet gases in the sintering being about 295° C., said agglomerating being accomplished by wetting a tumbling mixture of the solids with a spray of water.

14. A process of extracting the aluminum content of siliceous bauxite substantially without recycling of sintered material from the process, comprising agglomerating a mixture of bauxite, sodium carbonate and a calcium compound of the group consisting of lime and calcium hydroxide, with total water present in the granulation, including that combined in the calcium hydroxide, substantially in an amount necessary for but not substantially greater than that required for the hydration of the sodium carbonate to the monohydrate form, formation of the higher hydrates being avoided, the resulting granules being dried and ground to a size of about 1 to 3 mm. in their largest dimension, the calcium oxide content of the granules being that stoichiometrically required to bind at least the major part of the silica content of the mineral as calcium silico-aluminate to reduce loss of the sodium carbonate as insoluble sodium silico-aluminate and being not substantially more than that stoichiometrically required to bind all of the said silica content, adding granular carbonaceous fuel and drying and thereafter sintering, and then leaching with water, the said calcium compound, calculated as calcium hydroxide, being present in the range of from 10 to 12% by weight of the bauxite, said sintering being carried out by introducing air to burn said fuel, the hot combustion gases being withdrawn from below thereof by suction, said drying after adding fuel being to the extent required to result in a maximum of about 15% moisture calculated on the basis of the total mixture, the maximum temperature of the outlet gases in the sintering being about 295° C., said agglomerating being accomplished by wetting a tumbling mixture of the solids with a spray of water, the agglomerating being at a temperature between 40° and 65° C.

15. A process of recovering aluminum values from siliceous bauxite, comprising sintering a mass comprised of granules, the granules being about 1 to 3 mm. in largest dimension, the granules being formed of bauxite, sodium carbonate monohydrate, and a calcium compound of the group consisting of lime and calcium hydroxide, said compound being in a molar ratio of CaO to $SiO_2$ of from about 1.6 to one, to about two to one, the mass being further comprised of carbonaceous fuel, the mass having a maximum water content of about 15% of the total mixture, the sintering being carried out by heat derived by combustion of said fuel, and leaching the sintered mass with water.

16. A process of recovering aluminum values from siliceous bauxite, comprising sintering a mass comprised of granules, the granules being about 1 to 3 mm. in largest dimension, the granules being formed of bauxite, sodium carbonate monohydrate, and a calcium compound of the group consisting of lime and calcium hydroxide, said compound being in a molar ratio of CaO to $SiO_2$ of from about 1.6 to one, to about two to one, and being not more than 10% by weight of the bauxite, the mass being further comprised of carbonaceous fuel, the mass having a maximum water content of about 15% of the total mixture, the sintering being carried out by introducing air to burn said fuel, and leaching the sintered mass with water.

References Cited in the file of this patent

UNITED STATES PATENTS

| | | |
|---|---|---|
| 1,282,222 | Hall | Oct. 22, 1918 |
| 1,514,657 | Cowles | Nov. 11, 1924 |
| 1,926,744 | James | Sept. 12, 1933 |
| 1,971,354 | Scheidt et al. | Aug. 28, 1934 |
| 2,141,132 | Folger | Dec. 20, 1938 |
| 2,421,918 | Anderson et al. | June 10, 1947 |

OTHER REFERENCES

U.S. Dept. of Interior, Report of Investigations, R.I. 4462, June 1949, "Lime-Soda—Pilot-Plant Tests," Conley, John E., et al., p. 40 and FIG. 5 opposite page 66.

U.S. Dept. of Interior, Report of Investigation Publication No. R.I. 4462, June 1949, "Lime-Soda Sinter Process—Pilot-Plant Tests," by Conley, John E., et al., pp. 5, 6, 9, 10, 11 and FIGURE 1 opposite page 4.